US012085873B2

(12) United States Patent
Hagiwara et al.

(10) Patent No.: US 12,085,873 B2
(45) Date of Patent: Sep. 10, 2024

(54) DEVELOPING DEVICE AND IMAGE FORMING APPARATUS CAPABLE OF SHORTENING TIME REQUIRED TO CIRCULATE DEVELOPER IN CIRCULATION PATH

(71) Applicant: FUJIFILM Business Innovation Corp., Tokyo (JP)

(72) Inventors: Chihiro Hagiwara, Kanagawa (JP); Kiyoshi Sako, Kanagawa (JP); Keiji Sanekata, Kanagawa (JP); Masayuki Shimoda, Kanagawa (JP); Kento Terashima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/951,078

(22) Filed: Sep. 22, 2022

(65) Prior Publication Data

US 2023/0324830 A1 Oct. 12, 2023

(30) Foreign Application Priority Data

Mar. 23, 2022 (JP) ................................ 2022-047576

(51) Int. Cl.
*G03G 15/08* (2006.01)
*G03G 15/00* (2006.01)

(52) U.S. Cl.
CPC ..... *G03G 15/0891* (2013.01); *G03G 15/0882* (2013.01); *G03G 15/0884* (2013.01); *G03G 15/0889* (2013.01); *G03G 15/0893* (2013.01); *G03G 15/5008* (2013.01); *G03G 2215/0822* (2013.01); *G03G 2215/0827* (2013.01)

(58) Field of Classification Search
CPC ........... G03G 15/0891; G03G 15/0882; G03G 15/0889; G03G 15/5008; G03G 2215/0827; G03G 15/0893; G03G 15/0884; G03G 2215/0687; G03G 2215/069; G03G 2215/0838; G03G 2215/0822; G03G 15/0844
See application file for complete search history.

(56) References Cited

U.S. PATENT DOCUMENTS 11,086,251 B2 8/2021 Mase et al.
2010/0040391 A1* 2/2010 Uno .................... G03G 21/105 399/53

(Continued)

FOREIGN PATENT DOCUMENTS

JP H11119526 4/1999
JP 2018031868 3/2018
JP 2020060668 4/2020

*Primary Examiner* — Arlene Heredia
*Assistant Examiner* — Laura Roth
(74) *Attorney, Agent, or Firm* — JCIPRNET

(57) ABSTRACT

A developing device includes a housing in which a circulation path is formed by a first path through which a developer passed to a developing roll flows, a second path disposed offset from the first path in a direction of gravity, a pair of connecting ports connecting the first path and the second path, and a transport member that operates in the housing. The transport member transports the developer in a determined direction, or a reverse direction to the determined direction, in the circulation path according to a load applied for driving the transport member.

8 Claims, 11 Drawing Sheets

(56) References Cited

U.S. PATENT DOCUMENTS

| | | | | |
|---|---|---|---|---|
| 2010/0189455 | A1* | 7/2010 | Kim | G03G 15/0877 399/256 |
| 2011/0052221 | A1* | 3/2011 | Hirobe | G03G 15/0877 399/27 |
| 2016/0062269 | A1* | 3/2016 | Eto | G03G 15/0882 399/106 |
| 2018/0059575 | A1 | 3/2018 | Suda | |
| 2018/0335748 | A1* | 11/2018 | Shimizu | G03G 21/0064 |
| 2020/0117119 | A1* | 4/2020 | Mase | G03G 15/0863 |

* cited by examiner

DEVELOPING DEVICE AND IMAGE FORMING APPARATUS CAPABLE OF SHORTENING TIME REQUIRED TO CIRCULATE DEVELOPER IN CIRCULATION PATH

CROSS-REFERENCE TO RELATED APPLICATIONS

This application is based on and claims priority under 35 USC 119 from Japanese Patent Application No. 2022-047576 filed Mar. 23, 2022.

BACKGROUND

(i) Technical Field

The present invention relates to a developing device and an image forming apparatus.

(ii) Related Art

An image forming apparatus described in JP2020-60668A includes a developing device including an agitating rotating member that agitates a developer accommodated inside, a drive mechanism that drives the agitating rotating member to be able to rotate in forward and reverse directions, and detection means for detecting a state in which the developing device is set in an image forming apparatus main body, in which, in a case where the detection means detects that the developing device is set in the image forming apparatus main body under a given condition, a warm-up operation in which a reverse rotation and a forward rotation of the agitating rotating member are alternately repeated is executed by driving by the drive mechanism.

SUMMARY

In a developing device that transports a developer in a determined direction in a circulation path, a load required for transporting the developer may increase due to a bias of the developer inside. In such a case, in a configuration in which the developer is transported in a determined direction after repeating transporting the developer in a reverse direction to the determined direction and transporting the developer in the determined direction, the time required to circulate the developer in the circulation path by transporting the developer in the determined direction is longer.

Aspects of non-limiting embodiments of the present disclosure relate to a developing device and an image forming apparatus that shorten the time required to circulate a developer in a circulation path by transporting the developer in a determined direction, compared to a case of repeating transporting the developer in a reverse direction to the determined direction in a case where a load required for transporting the developer exceeds a reference value and transporting the developer in the determined direction at the same ratio.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a developing device including a housing in which a circulation path is formed by a first path through which a developer passed to a developing roll flows, a second path disposed offset from the first path in a direction of gravity, and a pair of connecting ports connecting the first path and the second path at a portion separated in a direction in which the developer flows; and a transport member that operates in the housing to transport the developer in a determined direction in the circulation path, in which the transport member transports the developer in the determined direction in a case where a load at a determined time during transportation in the determined direction is equal to or less than a reference value, transports the developer in a reverse direction to the determined direction in a case where the load at the determined time during transportation in the determined direction exceeds the reference value, and transports the developer in the determined direction in a case where a load during or after transportation in the reverse direction is equal to or less than an allowable value.

BRIEF DESCRIPTION OF THE DRAWINGS

Exemplary embodiment (s) of the present invention will be described in detail based on the following figures, wherein.

DETAILED DESCRIPTION

An example of a developing device and an image forming apparatus according to an exemplary embodiment will be described with reference to FIGS. 1 to 11.

Overall Configuration of Image Forming Apparatus

Figure 1:
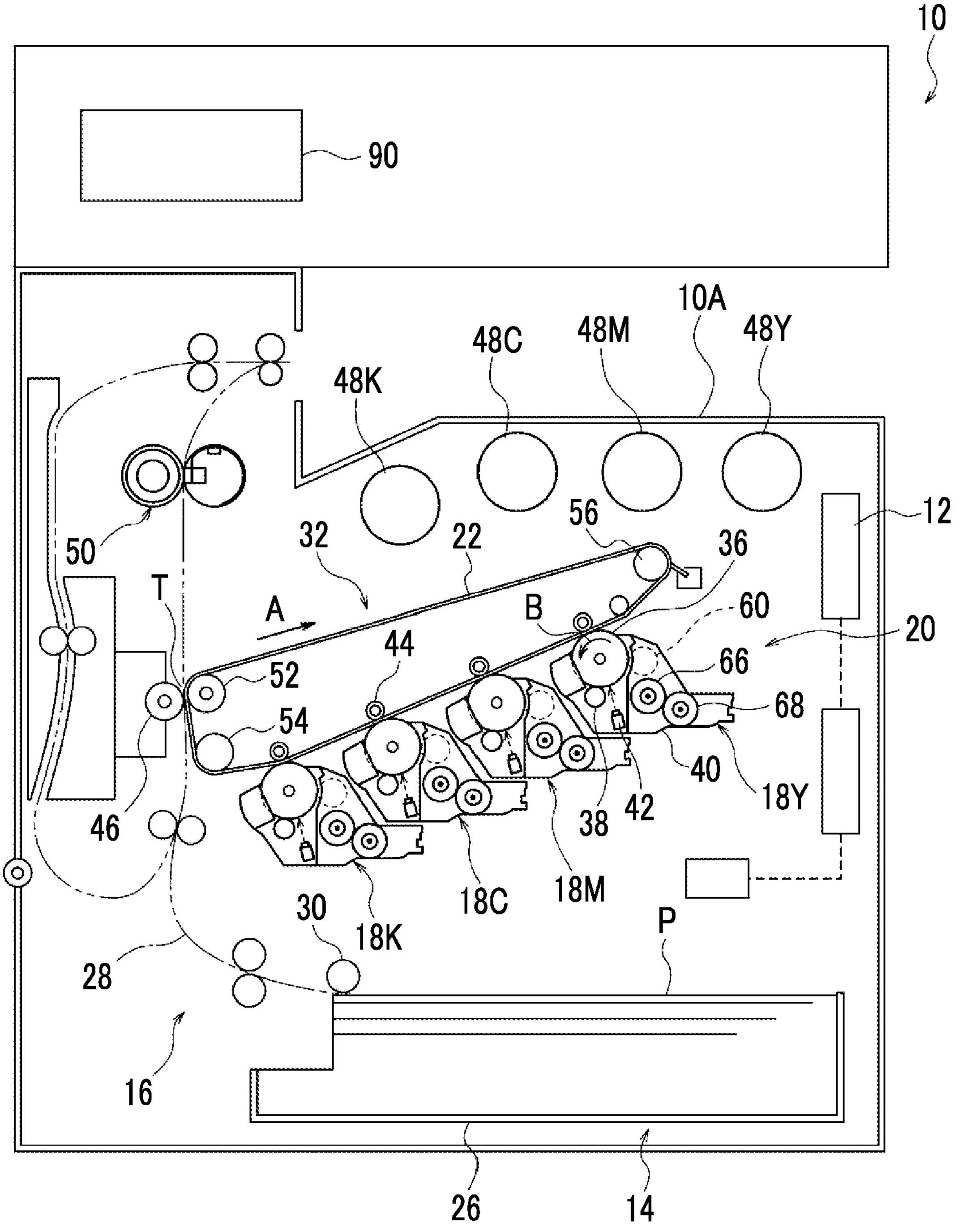
FIG. 1 is a layout diagram showing an overall configuration inside an image forming apparatus according to an exemplary embodiment.

As shown in FIG. 1, an image forming apparatus 10 according to an exemplary embodiment includes an accommodating portion 14 in which a sheet material P as a recording medium is accommodated, a transport unit 16 that transports the sheet material P accommodated in the accommodating portion 14, and a display operation unit 90.

Further, the image forming apparatus 10 includes an image formation unit 20 that forms an image on the sheet material P transported from the accommodating portion 14 by the transport unit 16, a motor 92 that drives the developing device 40 in the image formation unit 20, and a control unit 12 that controls each unit.

Accommodating Portion

The accommodating portion 14 has an accommodating member 26 that can be pulled out from an apparatus main body 10A of the image forming apparatus 10 toward a front side in an apparatus depth direction, and the sheet material P is loaded on the accommodating member 26. Further, the apparatus main body 10A has a delivery roll 30 that delivers the sheet material P loaded on the accommodating member 26 to a transport path 28 configuring the transport unit 16.

Transport Unit

The transport unit 16 has a plurality of transport rolls (reference numerals omitted) for transporting the sheet material P along the transport path 28 to which the sheet material P is transported.

Display Operation Unit

As shown in FIG. 1, the display operation unit 90 includes a touch panel display as an example, and is an example of a notification unit for notifying a user of information on the image forming apparatus 10 based on a signal received from the control unit 12 described later. The display operation unit 90 also functions as a reception unit for receiving a user operation.

Image Formation Unit

The image formation unit 20 is provided with four image forming units 18Y, 18M, 18C, and 18K of yellow (Y), magenta (M), cyan (C), and black (K). In the following description, in a case where it is not necessary to distinguish Y, M, C, and K, Y, M, C, and K may be omitted. Further, the image forming unit 18 of each color can be attached to and detached from the apparatus main body 10A, respectively.

Further, the image forming unit 18 of each color has a photoreceptor drum 36 that rotates in a direction of an arrow B in the figure, which is an example of an image holding body, and a charging member 38 that charges a surface of the photoreceptor drum 36.

Further, the image forming unit 18 has an exposure device 42 that irradiates the charged photoreceptor drum 36 with exposure light, and a developing device 40 that develops an electrostatic latent image formed by irradiating the photoreceptor drum 36 with exposure light and visualizes (develops) the electrostatic latent image as a toner image.

Further, the image formation unit 20 has an endless belt 22 with endless shape that circumferentially moves in a direction of an arrow A in the figure, an auxiliary roll 52 around which the endless belt 22 is wound, a tension applying roll 54, and a driving roll 56. Further, the image formation unit 20 has a primary transfer roll 44 that transfers the toner image formed by the image forming unit 18 of each color to the endless belt 22.

Further, the image formation unit 20 has a secondary transfer roll 46 that transfers the toner image transferred to the endless belt 22 to the sheet material P. A transfer device 32 includes the endless belt 22, the auxiliary roll 52, the tension applying roll 54, the driving roll 56, and the primary transfer roll 44. Further, the image formation unit 20 has a fixing device 50 for fixing the toner image to the sheet material P by heating and pressurizing the sheet material P to which the toner image is transferred.

Action of Image Forming Apparatus

In the image forming apparatus 10, an image is formed as follows.

First, the charging member 38 of each color to which voltage is applied uniformly negatively charges the surface of the photoreceptor drum 36 of each color at a predetermined potential. Subsequently, the exposure device 42 irradiates the surface of the photoreceptor drum 36 of each color charged based on image data input from an outside with exposure light to form an electrostatic latent image, thereby forming the electrostatic latent image corresponding to the data on the surface of the photoreceptor drum 36 of each color. Further, the developing device 40 of each color develops the electrostatic latent image and visualizes the electrostatic latent image as a toner image.

Further, the toner images formed on the surface of the photoreceptor drum 36 of each color are sequentially transferred to the endless belt 22 that circumferentially moves by the primary transfer roll 44. On the other hand, the sheet material P delivered from the accommodating member 26 to the transport path 28 by the delivery roll 30 is delivered to a transfer position T where the endless belt 22 and the secondary transfer roll 46 are in contact with each other.

At the transfer position T, the sheet material P is transported between the endless belt 22 and the secondary transfer roll 46, such that the toner image on an outer circumferential surface of the endless belt 22 is transferred to the sheet material P. The toner image transferred to the surface of the sheet material P is fixed to the sheet material P by the fixing device 50. Then, the sheet material P on which the toner image is fixed is discharged to an outside of the apparatus main body 10A.

Configuration of Main Parts

Developing Device

Next, a specific configuration of the developing device 40 of the exemplary embodiment will be described with reference to FIGS. 2 to 5 as appropriate.

Figure 2:
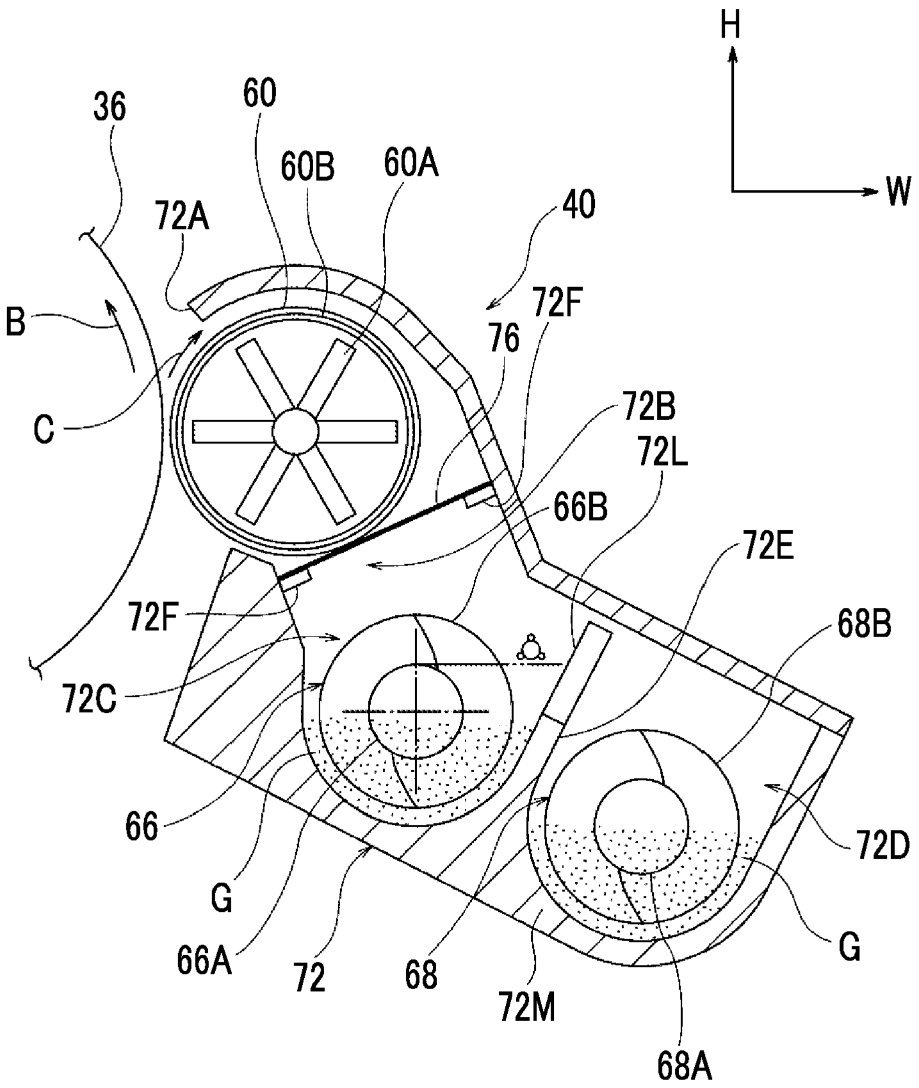
FIG. 2 is a cross sectional diagram of a developing device and a photoreceptor according to an exemplary embodiment as viewed from a front side.

As shown in FIG. 2, the developing device 40 includes a housing 72, a developing roll 60 disposed to face the photoreceptor drum 36, a supply auger 66 for supplying a developer G to the developing roll 60, and an agitating auger 68 for agitating the developer G. Further, the developing device 40 includes a heat seal 76 before the start of use such as after shipment and before installation at a place of use (for example, during transportation). The supply auger 66 and the agitating auger 68 are examples of transport members, and the heat seal 76 is an example of a sealing member.

As shown in FIG. 2, the housing 72 is disposed next to the photoreceptor drum 36, and in the housing 72, an opening 72A for exposing the developing roll 60 is formed to extend in the apparatus depth direction in a portion facing the photoreceptor drum 36.

Further, in the housing 72, a delivery path 72B in which the developing roll 60 is disposed is formed to extend in the apparatus depth direction on an opposite side of the photoreceptor drum 36 with the opening 72A interposed therebetween. Further, in the housing 72, a supply path 72C is formed diagonally below the delivery path 72B to extend in the apparatus depth direction.

Further, in the housing 72, on an opposite side of the delivery path 72B with the supply path 72C interposed therebetween, an agitating path 72D located offset downward in a direction of gravity with respect to the supply path 72C is formed to extend in the apparatus depth direction. The supply path 72C is an example of a first path, and the agitating path 72D is an example of a second path.

Further, in the housing 72, between the supply path 72C and the agitating path 72D, a partition plate 72E that partitions the supply path 72C and the agitating path 72D is formed to rise from an inner surface of a bottom wall 72M of the housing 72.

Figure 3:
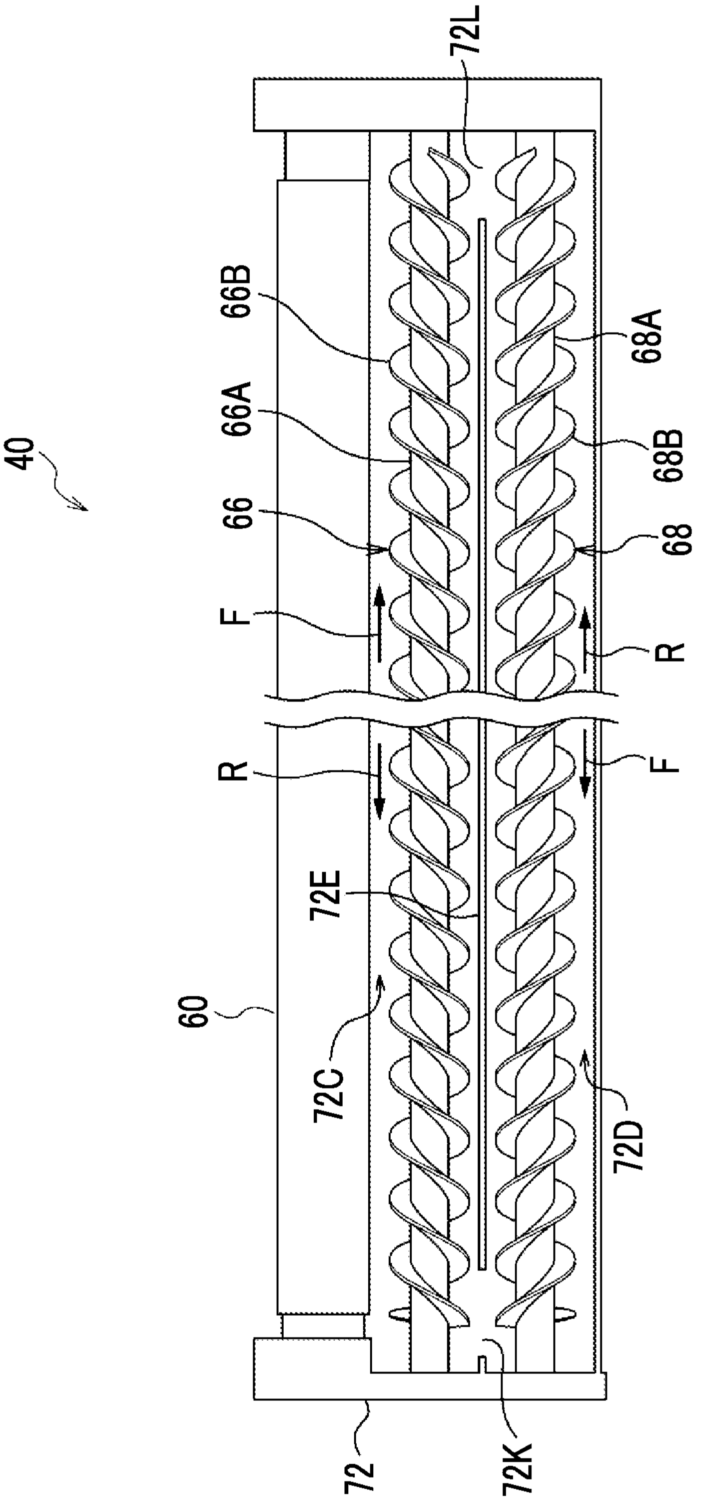
FIG. 3 is a schematic diagram showing main parts of a developing device according to an exemplary embodiment.

Further, as shown in FIG. 3, in the housing 72, a first connecting port 72K connecting the supply path 72C and the agitating path 72D is formed adjacent to an end portion of the partition plate 72E on the front side in the apparatus depth direction. Further, in the housing 72, a second connecting port 72L connecting the supply path 72C and the agitating path 72D is formed adjacent to an end portion of the partition plate 72E on an inner side in the apparatus depth direction. The first connecting port 72K and the second connecting port 72L are examples of a pair of connecting ports connecting the first path and the second path at portions separated in a direction in which the developer flows.

As a result, a circulation path through which the developer G circulates is formed by the supply path 72C, the agitating path 72D, the first connecting port 72K, and the second connecting port 72L. In the exemplary embodiment, the developer G is configured to circulate in a direction indicated by an arrow F in FIG. 3 by operating the supply auger 66 and the agitating auger 68. Regarding a term that defines each direction in the developing device 40, the front side (left side in FIG. 3) in the apparatus depth direction may be appropriately paraphrased as a downstream side of the agitating path 72D or an upstream side of the supply path 72C, and an inner side in the apparatus depth direction (right side in FIG. 3) may be appropriately paraphrased as an upstream side of the agitating path 72D or a downstream side of the supply path 72C.

As described above, the developing roll 60 is disposed on the delivery path 72B of the housing 72 described above. As shown in FIG. 2, a gap (development gap) for passing the developer G from the developing roll 60 to the photoreceptor drum 36 is formed between the developing roll 60 and the photoreceptor drum 36. The developing roll 60 includes a magnet roll 60A having a circular cross section and a rotary sleeve 60B that is placed on the magnet roll 60A and rotates around the magnet roll 60A. The rotary sleeve 60B is adapted to rotate in a direction of an arrow C (clockwise) in the figure by transmitting a rotational force from a drive source (not shown).

Further, the supply auger 66 is disposed in the supply path 72C of the housing 72, and the agitating auger 68 is disposed in the agitating path 72D of the housing 72. The agitating auger 68 includes an agitating shaft 68A extending in the apparatus depth direction and a spiral agitating blade 68B formed on an outer circumferential surface of the agitating shaft 68A. As shown in FIG. 3, the supply auger 66 includes a supply shaft 66A extending in the apparatus depth direction and a spiral supply blade 66B formed on an outer circumferential surface of the supply shaft 66A.

The supply auger 66 and the agitating auger 68 are supported by the housing 72 to be capable of forward and reverse rotation, and are adapted to transport the developer G in the direction of the arrow F by rotating in a forward direction, and to transport the developer G in a direction of an arrow R by rotating in a reverse direction. The direction of the arrow F is an example of a determined direction, and the direction of the arrow R is an example of a reverse direction to the determined direction. Therefore, in a case where the supply auger 66 and the agitating auger 68 continue to rotate in the forward direction, the developer G circulates in the circulation path in an order of the agitating path 72D, the first connecting port 72K, the supply path 72C, and the second connecting port 72L.

As shown in FIG. 2, the heat seal 76 is a film made of polyethylene as an example, which is provided between the supply path 72C and the developing roll 60. The heat seal 76 is configured to prevent the developer G from spilling from the supply path 72C to the outside of the developing device 40 during transportation by blocking a space between the supply path 72C and the developing roll 60 as viewed in the apparatus depth direction. The heat seal 76 is heat-welded to, for example, a frame member 72F having a rectangular frame shape attached to the housing 72 in a double-folded state. An end portion of the heat seal 76 folded back on a welded portion to the frame member 72F protrudes from an end portion of the housing 72 on the front side. In a case where the end portion protruding from the end portion of the housing 72 on the front side is pulled, the heat seal 76 is pulled out to the outside of the housing 72 while being peeled off from the frame member 72F.

The developing device 40 described above can be attached to and detached from the apparatus main body 10A. For example, in a case where the developer G in the developing device 40 is worn more than a predetermined reference due to the rotational drive of the supply auger 66 and the agitating auger 68, the developer G is replaced with a new one.

Coupling Structure Between Developing Device and Apparatus Main Body

Figure 5:
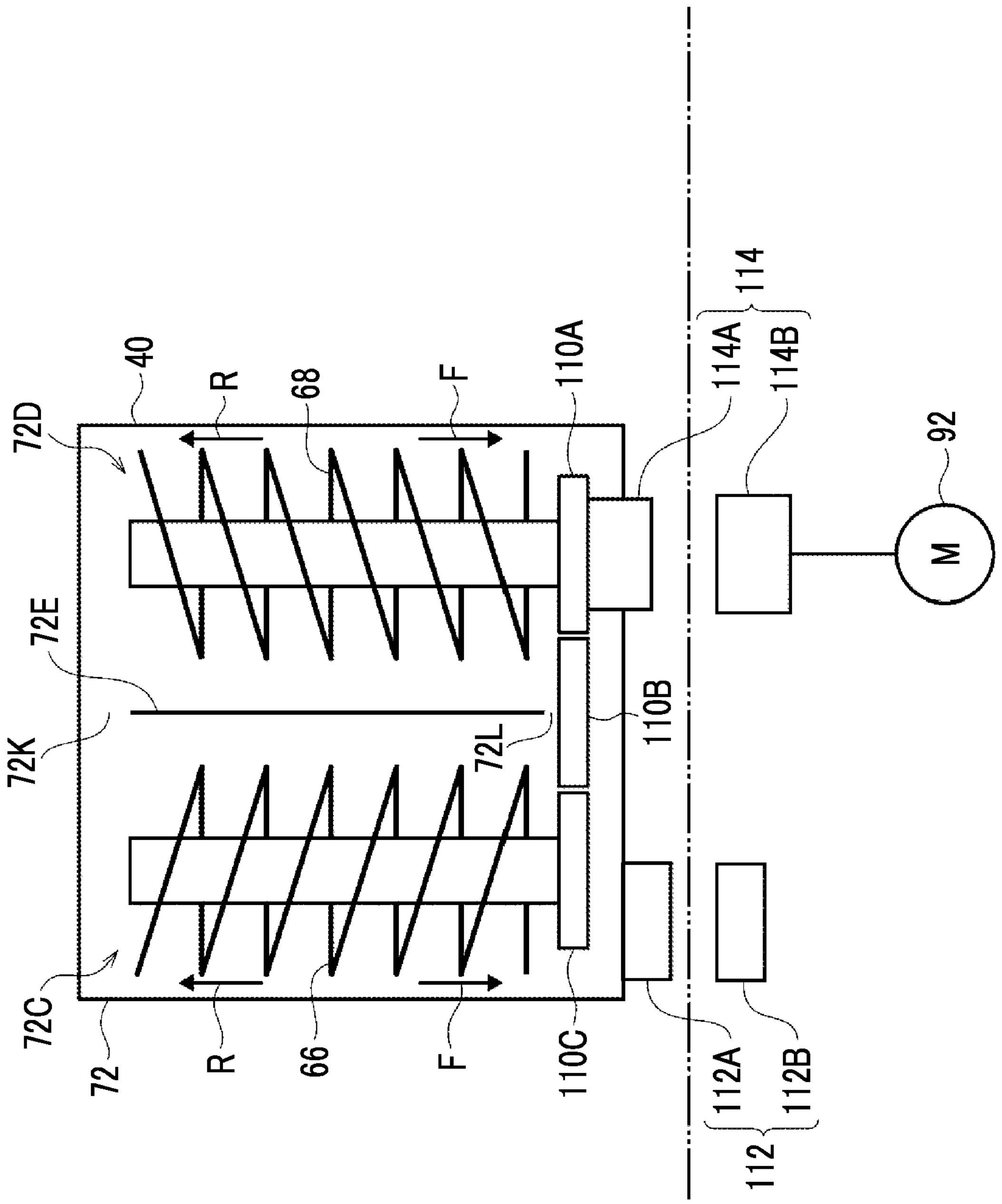
FIG. 5 is a schematic diagram showing a configuration of a developing device according to an exemplary embodiment.

As shown in FIG. 5, the apparatus main body 10A is provided with a motor 92 for generating power for rotating the supply auger 66 and the agitating auger 68 of the mounted developing device 40. The motor 92 is, for example, a DC brushless motor, which is rotated by a current supplied from a driver 96 controlled by a control unit 12 described later, and rotationally drives the supply auger 66 and the agitating auger 68 of the developing device 40.

Further, a coupling 114 as a transmission mechanism for transmitting the power of the motor 92 to the supply auger 66 and the agitating auger 68 is provided between the apparatus main body 10A and the developing device 40.

Specifically, the coupling 114 has an auger side member 114A coupled to the agitating auger 68 and a motor side member 114B coupled to the rotation shaft of the motor 92. The coupling 114 meshes along with the operation of the developing device 40 being mounted on the apparatus main body 10A, and transmits the power (rotation) of the motor 92 to the agitating auger 68 in the meshed state. Further, in the present exemplary embodiment, the power transmitted to the agitating auger 68 is transmitted to the supply auger 66 via a gear 110A coupled to the agitating auger 68, an intermediate gear 110B rotatably supported by the housing 72, and a gear 110C coupled to the supply auger 66.

Further, a connector 112 is provided between the developing device 40 and the apparatus main body 10A. The connector 112 has a connector 112A on the developing device 40 side and a connector 112B on the apparatus main body 10A side. In the connector 112, as the developing device 40 is mounted on the apparatus main body 10A, the connector 112A and the connector 112B are electrically coupled to each other.

Control Unit

Subsequently, the control unit 12 will be described with reference to FIGS. 4 and 5 as appropriate.

Figure 4:
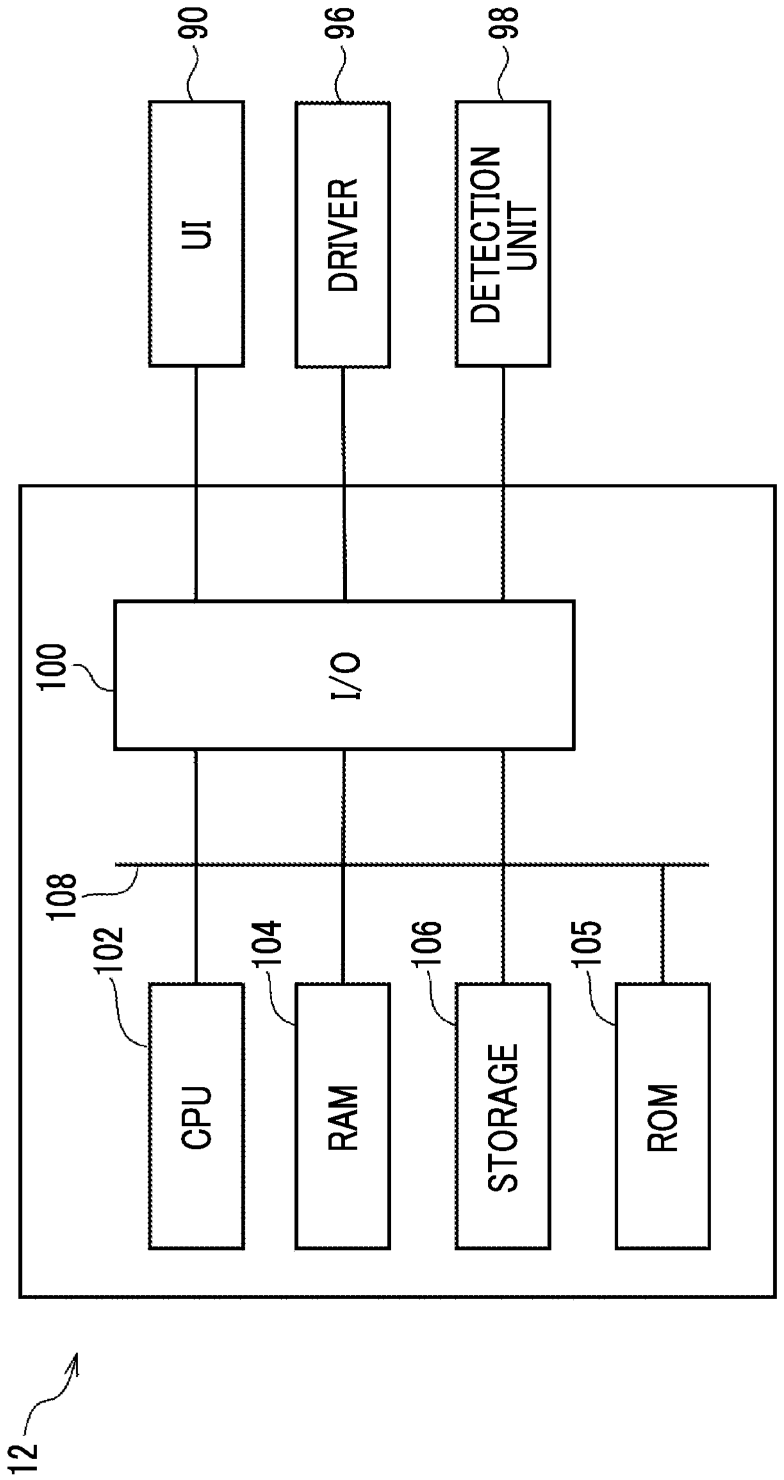
FIG. 4 is a block diagram showing a configuration of a control unit according to an exemplary embodiment.

As shown in FIG. 4, the control unit 12 of the exemplary embodiment has, as an example, a central processing unit (CPU) 102, a random access memory (RAM) 104, a read only memory (ROM) 105, a storage 106, and an input/output unit 100. Further, the CPU 102, the RAM 104, the ROM 105, the storage 106, and the input/output unit 100 are coupled to each other through a bus 108.

Further, as shown in FIG. 4, the input/output unit 100 of the control unit 12 is coupled to the display operation unit 90, the driver 96, and a detection unit 98, respectively.

The driver 96 supplies a drive current for rotating the supply auger 66 and the agitating auger 68 of the developing device 40 to the motor 92. A magnitude of the drive current supplied by the driver 96 to the motor 92 is fed back from the driver 96 to the input/output unit 100 and calculated by the CPU 102.

Further, the detection unit 98 detects an individual identification number recorded in a recording unit incorporated in the developing device 40 by communicating with the developing device 40 via the connector 112. Further, the individual identification number of the developing device 40 detected by the detection unit 98 is transmitted to the input/output unit 100.

Next, with reference to FIG. 6, control of setup in a case where the developing device 40 of the exemplary embodiment is attached to the apparatus main body 10A will be described.

Figure 6:
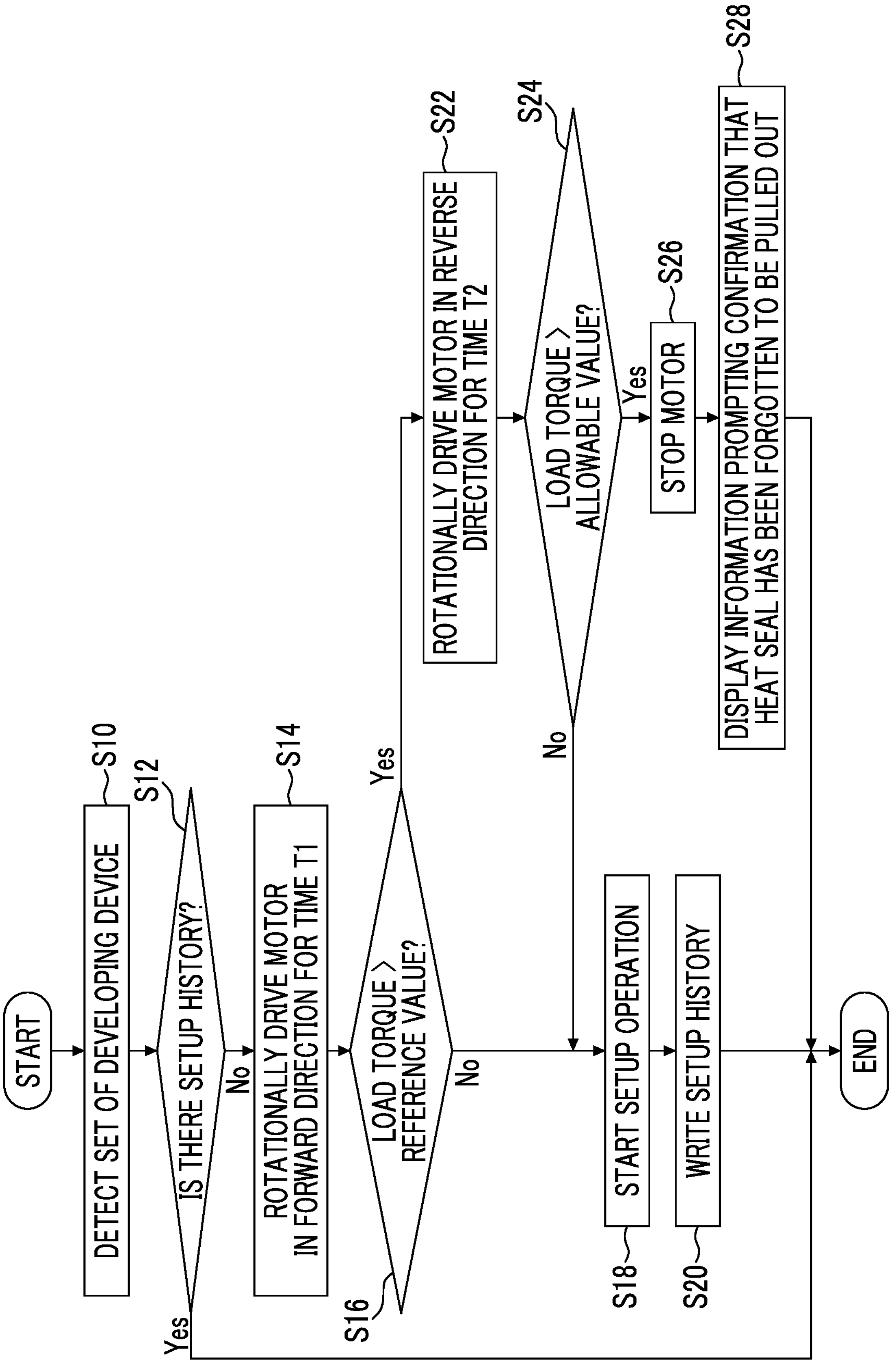
FIG. 6 is a flowchart showing a control flow of a control unit according to an exemplary embodiment.

Control of Setup in Case where Developing Device is Attached to Apparatus Main Body As shown in FIG. 6, the CPU 102 of the control unit 12 detects that the developing device 40 is attached to the apparatus main body 10A as step S10. The CPU 102 detects the individual identification number of the developing device 40 through the detection unit 98, and proceeds to step S12.

Further, in step S12, the CPU 102 determines whether a setup history is stored in the storage 106 for the individual identification number of the developing device 40 detected by the detection unit 98.

Here, in a case where the individual identification number of the developing device 40 detected by the detection unit 98 in step S10 is stored in the setup history, the CPU 102 ends the control of the setup of the developing device 40 and performs a normal operation. In a case where the individual identification number of the developing device 40 is not stored in the setup history, the processing proceeds to step S14. Further, in step S14, the CPU 102 rotationally drives the motor 92 in the forward direction for a predetermined time T1 to rotate (operate) the agitating auger 68 and the supply auger 66 in the forward rotation (operation). In other words, the CPU 102 causes the developer G to be transported in the direction of the arrow F for the time T1 (hereinafter, may be referred to as "forward transportation"). In a case where the time T1 is reached from the start of the forward transportation, it is an example of a determined time. The time T1 is set to be sufficiently r than the time required for the developer G to circulate once in the circulation path by the operation of the agitating auger 68 and the supply auger 66, and is, for example, five seconds.

Further, in step S14, the CPU 102 acquires from the driver 96 a current value for driving the motor 92 in a case where the time T1 is reached from the start of the forward transportation. In other words, in step S14, the CPU 102 acquires a torque (hereinafter, referred to as a load torque) for rotating the motor 92 in order to forwardly transport the developer G. The torque is an example of a load at a determined time during transportation in a determined direction. After that, the CPU 102 proceeds to step S16.

Further, in step S16, the CPU 102 determines whether the current value acquired in step S14 exceeds a predetermined reference value VL.

Further, in a case where a negative determination is made in step S16, the CPU 102 proceeds to step S18 and starts a setup operation of the developing device 40. The appropriately set based on the setup operation is specifications of the developing device 40 and the image forming apparatus 10, but includes a circulating operation of the developer G in the direction of the arrow F by the forward transportation.

Further, the CPU 102 proceeds to step S20 after the setup operation is completed in step S18, and stores the setup history in the storage 106.

Then, after storing the setup history, the CPU 102 ends the control of the setup.

Further, in a case where a positive determination is made in step S16, the CPU 102 proceeds to step S22 and rotationally drives the motor 92 in the reverse direction for a predetermined time T2 to reversely rotate the agitating auger 68 and the supply auger 66. In other words, the CPU 102 causes the developer G to be transported in the direction of the arrow R (hereinafter, may be referred to as "reverse transportation") for the time T2. The time T2 is set to be sufficiently shorter than the time required for the developer G to circulate once in the reverse direction in the circulation path by the reverse rotation of the agitating auger 68 and the supply auger 66, and is, for example, ten seconds. Further, in step S22, the CPU 102 acquires from the driver 96 the current value for driving the motor 92 (during the reverse transportation) in a case where the time T2 is reached from the start of the reverse transportation. In other words, in step S22, the CPU 102 acquires the load torque. The torque is an example of a load at a determined time during transportation in a reverse direction to the determined direction. After that, the CPU 102 proceeds to step S24.

Further, in step S24, the CPU 102 determines whether the current value acquired in step S22 exceeds a predetermined allowable value AL. Further, in a case where a negative determination is made in step S24, the CPU 102 proceeds to step S18 and starts the above-described setup operation. The reference value VL and the allowable value AL in the above description may be different values or may be the same value.

Further, in a case where a positive determination is made in step S24, the CPU 102 proceeds to step S26 and stops the motor 92 to stop the agitating auger 68 and the supply auger 66. After that, the CPU 102 proceeds to step S28.

Further, in step S28, the CPU 102 transmits a signal to the display operation unit 90 to display information prompting confirmation that the heat seal 76 has been forgotten to be pulled out. In other words, the control unit 12 notifies removal of the heat seal 76. Then, after notifying the removal of the heat seal 76, the CPU 102 ends the control of the setup.

Action

Next, in the image forming apparatus 10 of the present exemplary embodiment, the action by the control of the control unit 12 described above will be described with reference to FIGS. 7 to 11 as appropriate.

Action in Case where Developer is Biased Toward Front Side

Figure 7:
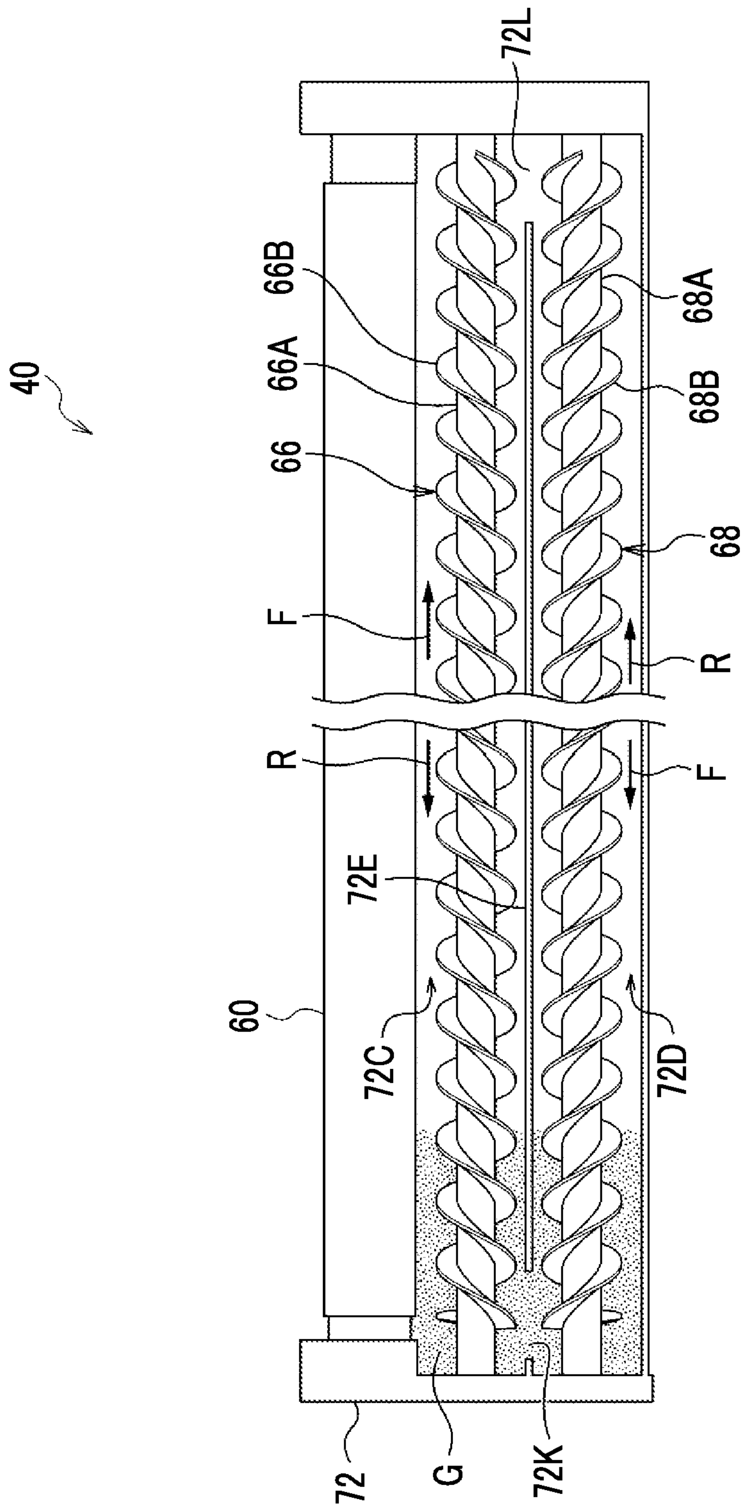
FIG. 7 is a schematic diagram showing a state in which a developer is biased toward a front side in a developing device according to an exemplary embodiment.

First, as shown in FIG. 7, the action in a case where the developing device 40 is mounted on the apparatus main body 10A in a state where the developer G is biased toward the front side inside the developing device 40 will be described.

Figure 10:
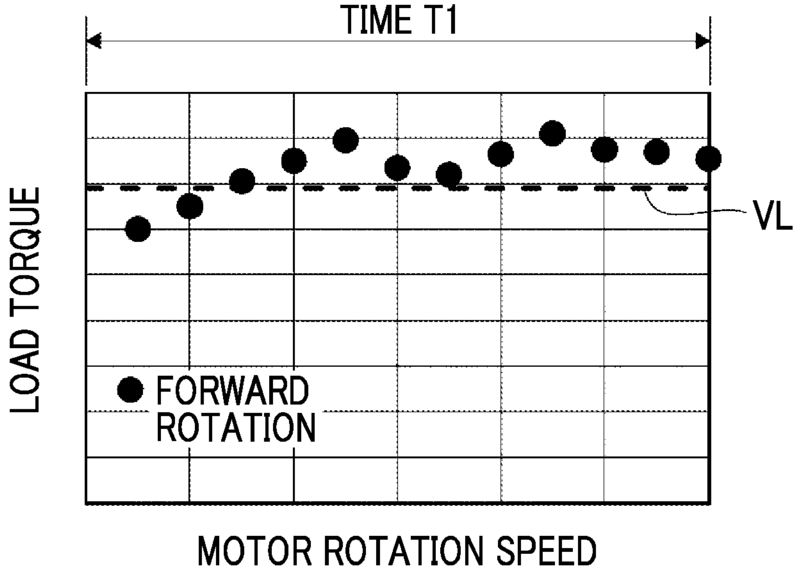
FIG. 10 is a diagram showing a relationship between a motor rotation speed and a load torque in a transport member of a developing device according to an exemplary embodiment.

After the developing device 40 is attached to the apparatus main body, the developer G is forwardly transported for the time T1. In a case where the developing device 40 is mounted on the apparatus main body 10A in a state where the developer G is biased toward the front side inside the developing device 40, the first connecting port 72K is blocked by the developer G. In a case where the developer G is forwardly transported from this state, the supply path 72C is located above the agitating path 72D, such that the load required for the forward transportation of the developer G gradually increases as shown in FIG. 10, and the load torque exceeds the reference value VL in the determination of step S16. In this way, in a case where the developing device 40 is attached to the apparatus main body 10A in a state where the developer G is biased toward the front side inside the developing device 40, a positive determination is made in step S16, and the processing proceeds to step S22.

Then, in step S22, the developer G is reversely transported for the time T2, and the developer G is dispersed in the agitating path 72D, such that clogging of the developer G at the first connecting port 72K is gradually cleared. As a result, as shown in FIG. 11, the load torque gradually decreases in accordance with the rotation speed of the motor 92 in the reverse direction, and is equal to or less than the allowable value AL in the determination of step S24.

Figure 11:
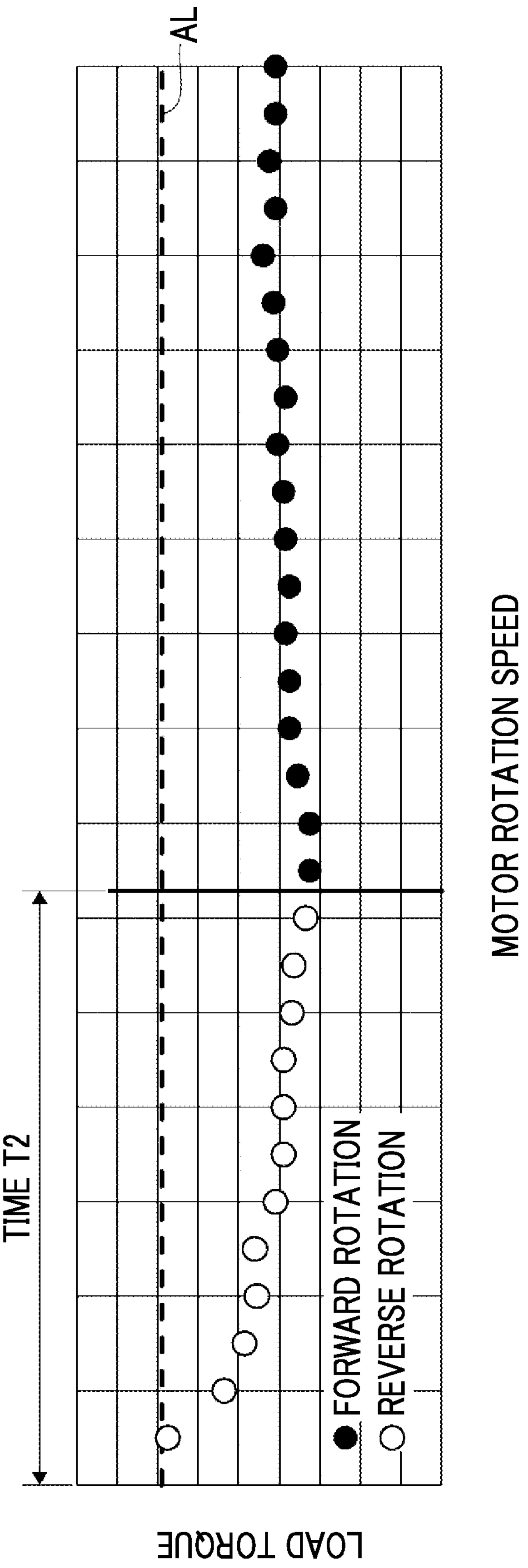
FIG. 11 is a diagram showing a relationship between a motor rotation speed and a load torque in a transport member of a developing device according to an exemplary embodiment.

Further, in this state, since the developer G is dispersed inside the agitating path 72D in step S22, even in a case where the agitating auger 68 is forwardly rotated again, the load torque is unlikely to exceed the allowable value AL as shown in FIG. 11. Therefore, a negative determination is made in step S24, and the processing proceeds to step S18.

In other words, in a case where the load torque during or after the reverse transportation of the developer G is equal to or less than the allowable value AL, the control unit 12 according to the exemplary embodiment circulates the developer G in the direction of the arrow F by the forward transportation.

As described above, in the present exemplary embodiment, in a case where the positive determination is made in step S16, it is possible to perform only a reverse circulation and then shift to a normal setup operation in step S18. According to another viewpoint, in the exemplary embodiment, it can be said that in a case where the load torque required for the forward transportation of the developer G is large (in the case of the positive determination in step S16), a ratio of the time for reversely transporting the developer G is large as compared with the case where the load torque is small (in a case of the negative determination in step S16).

After that, the developing device 40 performs a normal operation after the setup operation is executed as in steps S18 and S20 described above.

Action in Case where Developer is Biased Toward Inner Side

Figure 8:
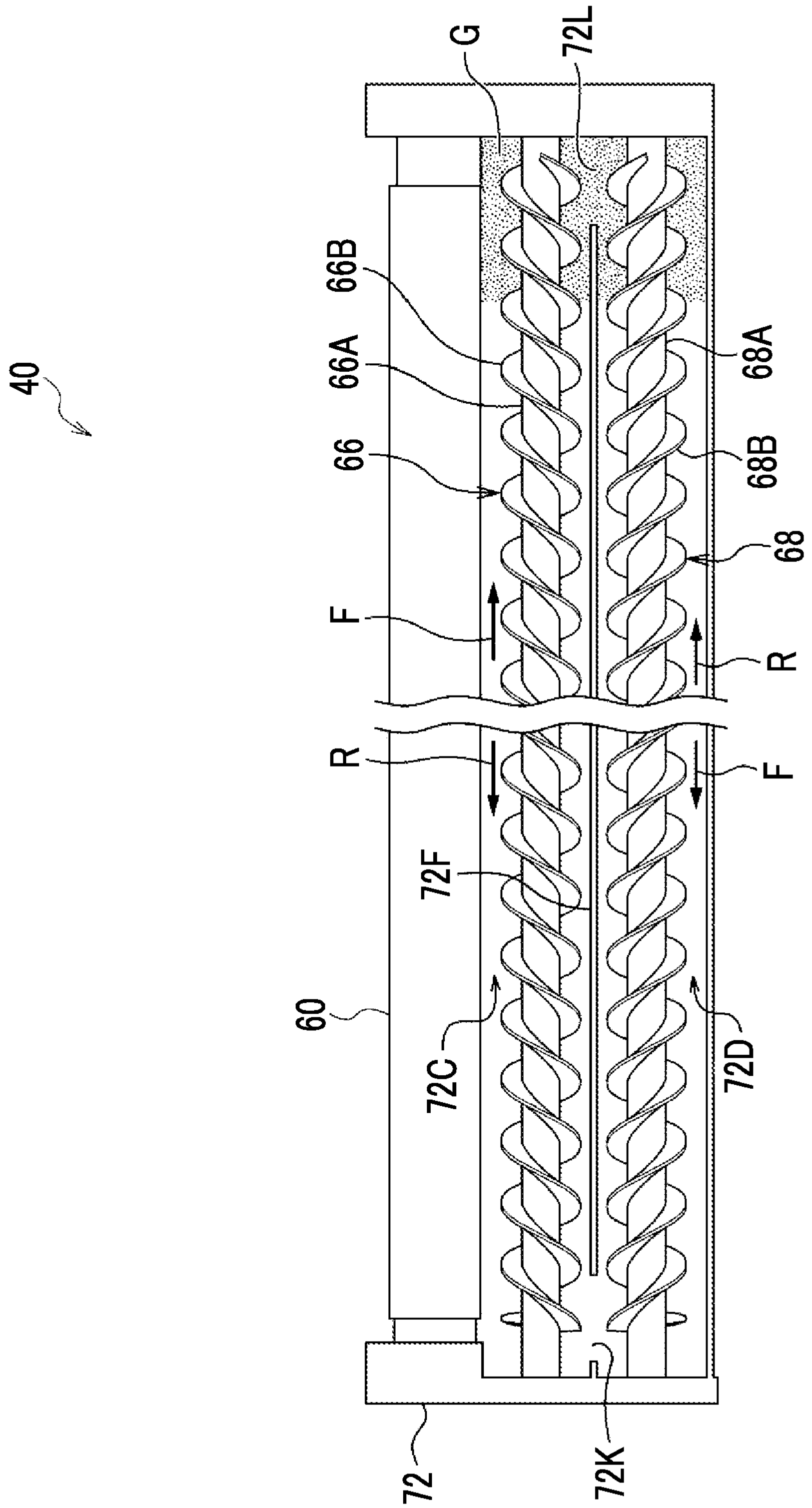
FIG. 8 is a schematic diagram showing a state in which a developer is biased toward an inner side in a developing device according to an exemplary embodiment.

Subsequently, as shown in FIG. 8, the action in a case where the developing device 40 is mounted on the apparatus main body 10A in a state where the developer G is biased toward the inner side inside the developing device 40 will be described.

After the developing device 40 is attached to the apparatus main body, the developer G is forwardly transported for the time T1. In a case where the developing device 40 is mounted on the apparatus main body 10A in a state where the developer G is biased toward the inner side inside the developing device 40, the second connecting port 72L is blocked by the developer G as shown in FIG. 8.

However, in a case where the developer G is forwardly transported from the state, the developer G flows down from the supply path 72C to the agitating path 72D through the second connecting port 72L due to gravity, such that the second connecting port 72L is less likely to be clogged. Therefore, the load torque is equal to or less than the reference value VL in step S16. As a result, in a case where the developing device 40 is attached to the apparatus main body 10A in a state where the developer G is biased toward the inner side inside the developing device 40, a negative determination is made in step S16, and the processing proceeds to step S18.

After that, the developing device 40 performs a normal operation after the setup operation is executed as in steps S18 and S20 described above.

Action in Case where Heat Seal is not Pulled Out

Figure 9:
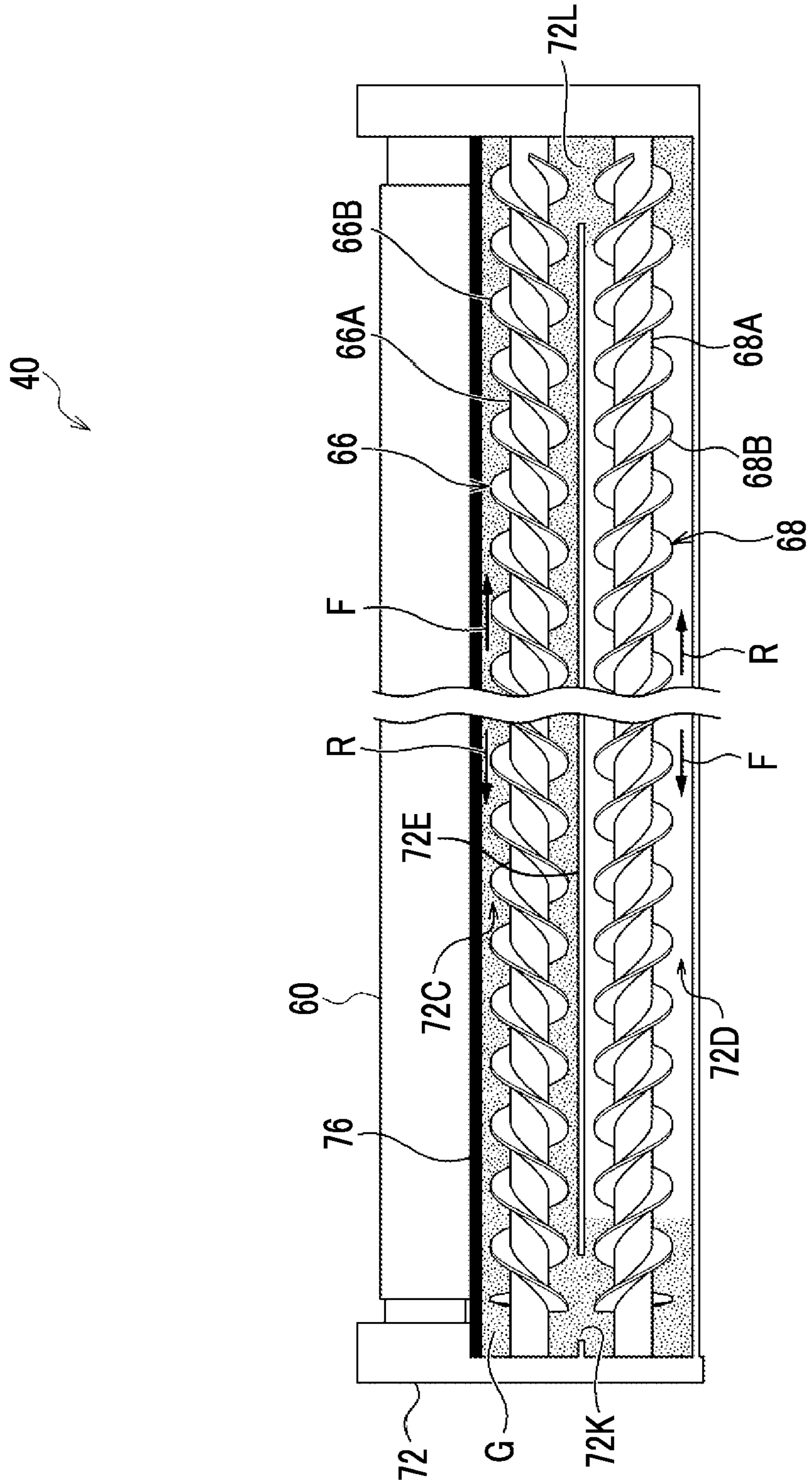
FIG. 9 is a schematic diagram showing a state in which a developer is clogged without a heat seal being pulled out in a developing device according to an exemplary embodiment.

Further, as shown in FIG. 9, the developing device 40 may be attached to the apparatus main body 10A in a state where the heat seal 76 is not pulled out from the developing device 40. The action of the control unit 12 and the developing device 40 in this case will be described.

After the developing device 40 is attached to the apparatus main body, the developer G is forwardly transported for the time T1. Here, in a case where the developing device 40 is attached to the apparatus main body 10A without the heat seal 76 being pulled out from the developing device 40, as shown in FIG. 9, the developer G is prevented from being supplied to the developing roll 60 from the supply path 72C. In a case where the developer G is forwardly transported from the state, the developer G is not discharged from the supply path 72C to the developing roll 60 but is accumulated inside the supply path 72C, such that the load torque of the motor 92 increases, and a positive determination is made in step S16.

After that, in step S22, the developer G is reversely transported for the time T2. Even with this, the developer G is not discharged from the supply path 72C to the developing roll 60 but is accumulated inside the supply path 72C, such that the load torque of the motor 92 does not decrease and exceeds the allowable value AL. As a result, in a case where the developing device 40 is attached to the apparatus main body 10A without the heat seal 76 being pulled out from the developing device 40, a negative determination is made in step S24, and the processing proceeds to step S26.

After that, the control unit 12 stops the motor 92 as in steps S26 and S28 described above, and causes the display operation unit 90 to display that the heat seal 76 has been forgotten to be pulled out, thereby prompting the user to pull out the heat seal 76. In a case where the user detaches the developing device 40 from the apparatus main body 10A and mounts again the developing device 40 with the heat seal 76 pulled out to the apparatus main body 10A, the control of the setup is started. In this case, since the setup history is not written in step S20, a negative determination is made in step S12, and the developing device 40 is set up.

Action and Effect

According to the developing device 40 and the image forming apparatus 10 of the exemplary embodiment, the following actions and effects can be obtained.

In the developing device 40 of the exemplary embodiment, the agitating auger 68 maintains the forward transportation in a case where the load torque after the time T1 during the forward transportation is equal to or less than the reference value VL, and in a case where the load torque after the time T1 exceeds the reference value VL, the developer G is transported in the reverse direction to the determined direction.

As a result, the time required for the developer G to be circulated by the forward transportation may be shortened by performing the setup operation after the reverse transportation, compared with the case where the reverse transportation and the forward transportation of the developer G are repeated at the same ratio in a case where the load required for transporting the developer G exceeds the reference value VL.

Further, in the developing device 40 of the exemplary embodiment, in the agitating auger 68, in a case where the load required for the forward transportation of the developer G is large, the ratio of the operating time for reversely transporting the developer G is large as compared with the case where the load is small.

As a result, the time required for the developer G to be circulated by the forward transportation may be shortened by performing the setup operation after the reverse transportation, compared with the case where the reverse transportation and the forward transportation of the developer G are repeated at the same ratio in a case where the load required for the forward transportation of the developer G exceeds the reference value VL.

Further, in the developing device 40 of the exemplary embodiment, in the agitating auger 68, the load for transporting the developer G is measured by the current value flowing through the motor 92.

As a result, the load of the agitating auger 68 may be measured with a simple configuration as compared with the developing device 40 provided with a dedicated measuring device for measuring the load of the agitating auger 68.

Further, in the developing device 40 of the exemplary embodiment, a forward rotation speed at the time when the developer G is forwardly transported and a reverse rotation speed at the time when the developer G is reversely transported are equal to each other.

This facilitates the calculation for obtaining the load as compared with the case where the rotation speed of the agitating auger 68 for reverse transportation is different from the rotation speed of the agitating auger 68 for forwardly transporting the developer G.

Further, the developing device 40 of the exemplary embodiment further includes the heat seal 76 that prevents the developer G from spilling between the second path and the developing roll 60 during transportation.

This makes it possible to prevent the developer G from spilling from the developing device 40 during transportation, as compared with the case where the developer G may be moved between the second path and the developing roll 60.

Further, the image forming apparatus 10 of the exemplary embodiment includes the developing device 40 of the exemplary embodiment and the transfer device 32 for transferring the toner image to the recording medium.

As a result, the time required for the image forming apparatus 10 to be in an image forming state may be shortened, compared with the image forming apparatus 10 provided with the developing device 40, which repeats the reverse transportation and the forward transportation of the developer G at the same ratio in a case where the load required for circulation of the developer G is larger than the reference value VL.

Further, the image forming apparatus 10 of the exemplary embodiment includes the developing device 40, the transfer device 32 for transferring the toner image to the recording medium, and the display operation unit 90 that notifies the removal of the heat seal 76 of the developing device 40 in a case where the load during or after the reverse transportation by the transport member exceeds the allowable value AL.

As a result, in a case where the load during or after the reverse transportation by the agitating auger 68 exceeds the allowable value AL, the user may be prompted to remove the heat seal 76.

Modification

The configuration of the developing device 40 and the image forming apparatus 10 according to the present disclosure is not limited to the above description.

For example, in the above description, an example in which the coupling 114 is provided between the motor 92 and the agitating auger 68 is shown, but the present disclosure is not limited to this, and for example, the coupling 114 may be provided between the motor 92 and the supply auger 66. Further, the example in which the power is transmitted between the agitating auger 68 and the supply auger 66 is shown, but the present disclosure is not limited to this, and the agitating auger 68 and the supply auger 66 may be independently driven.

Further, in the above description, the reverse transportation is performed for the time T2 in step S22, but the present disclosure is not limited to this. For example, in step S22, the reverse transportation and the forward transportation may be alternately performed such that a total time of the reverse transportation is longer than a total time of the forward transportation.

Further, in the above description, the developing device 40 blocked the first connecting port 72K, and it is detected that the load torque of the supply auger 66 and the agitating auger 68 is increased by the current value of the motor 92, but the present disclosure is not limited to this. For example, the torque related to the supply auger 66 and the agitating auger 68 may be directly measured.

Further, in the above description, an example of acquiring the current value, that is, the load torque, for driving the motor 92 (during reverse transportation) in a case where the time T2 is reached from the start of the reverse transportation has been shown, but the present disclosure is not limited to this. For example, the forward transportation may be performed after the reverse transportation, and the determination in step S24 may be performed based on the load torque during the forward transportation. The load torque during forward transportation is an example of the load after transportation in the reverse direction to the determined direction. Further, in the above description, an example in which the time T2 is longer than the time T1 is shown, but the present disclosure is not limited to this. For example, the time T2 may be a time equal to or less than the time T1.

Further, in the above description, the forward rotation speed and the reverse rotation speed of the motor 92 are the same, but the present disclosure is not limited to this. For example, the speed of either the forward rotation or the reverse rotation of the motor 92 may be larger than the speed of the other.

Further, in the above description, although the developing device 40 is provided with the heat seal 76 at the time of transportation, the present disclosure is not limited to this. For example, instead of the above-described configuration, a configuration that does not have the heat seal 76 may be adopted.

Further, in the above description, in a case where the control unit 12 detects that the heat seal 76 has not been pulled out, the image forming apparatus 10 has displayed on the display operation unit 90 that the heat seal 76 has been forgotten to be pulled out, but the present disclosure is not limited to this. For example, instead of the display on the display operation unit 90, the notification may be performed by voice, a warning light, or the like, or the notification may not be displayed.

Further, in the above description, the motor 92 is capable of forward rotation and reverse rotation, but the present disclosure is not limited to this. For example, the motor 92 may be a motor 92 that does not perform the reverse rotation. In this case, for example, by disconnecting the rotational force between the motor 92 and the developing device 40 by a clutch, and inserting a gear between a secondary side of the clutch and the coupling 114, the rotational direction of the rotational force transmitted to the developing device 40 is reversed.

Further, in the above description, an example is shown in which the agitating path 72D of the developing device 40 is located offset downward with respect to the supply path 72C, but the present disclosure is not limited to this. For example, the agitating path 72D of the developing device 40 may be located offset upward with respect to the supply path 72C. In this case, the control of the setup performed in the case of FIG. 7 and the case of FIG. 8 is reversed.

Although the exemplary embodiments of the present disclosure have been described above with reference to the accompanying drawings, it is clear that anyone with ordinary knowledge in the field of the art to which the present disclosure belongs can come up with various modifications or applications within the scope of the technical ideas described in the claims, and it is understood that these also naturally belong to the technical scope of the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A developing device comprising:

a housing in which a circulation path is formed by a first path through which a developer passed to a developing roll flows, a second path disposed offset from the first path in a direction of gravity, and a pair of connecting ports connecting the first path and the second path; and a transport member that operates in the housing to transport the developer in a determined direction, or a reverse direction to the determined direction, in the circulation path according to a torque applied for driving the transport member, wherein the transport member comprises a developer auger and is rotationally driven by a motor, wherein when the applied torque obtained during the transportation of the developer in the determined direction is determined to be equal to or less than a reference value, the transport member transports the developer in the determined direction, wherein when the applied torque obtained during the transportation of the developer in the determined direction is determined to be greater than the reference value, the transport member transports the developer in the reverse direction, wherein when the applied torque obtained after the transportation of the developer in the determined direction and during the transportation of the developer in the reverse direction is determined to be equal to or less than an allowable value, the transport member transports the developer in the determined direction.

2. The developing device according to claim 1, wherein a reverse rotation speed of the motor at which the developer is transported in the reverse direction is equivalent to a forward rotation speed of the motor at which the developer is transported in the determined direction.

3. The developing device according to claim 2, further comprising:

a sealing member that prevents the developer from spilling between the second path and the developing roll before an initial use of the developing device.

4. An image forming apparatus comprising:

the developing device according to claim 2 that develops an electrostatic latent image formed on an image holding body as a toner image; and a transfer device that transfers the toner image to a recording medium.

5. The developing device according to claim 1, further comprising:

a sealing member that prevents the developer from spilling between the second path and the developing roll before an initial use of the developing device.

6. An image forming apparatus comprising:

the developing device according to claim 5 that develops an electrostatic latent image formed on an image holding body as a toner image; and a transfer device that transfers the toner image to a recording medium.

7. An image forming apparatus comprising:

the developing device according to claim 5 that develops an electrostatic latent image formed on an image holding body as a toner image;

a transfer device that transfers the toner image to a recording medium; and a notification unit that notifies removal of the sealing member of the developing device in a case where the torque applied during or after the transportation of the developer in the reverse direction by the transport member exceeds the allowable value.

8. An image forming apparatus comprising:

the developing device according to claim 1 that develops an electrostatic latent image formed on an image holding body as a toner image; and a transfer device that transfers the toner image to a recording medium.

* * * * *